United States Patent [19]

Wier et al.

[11] 4,258,815

[45] Mar. 31, 1981

[54] AMBULATOR DRIVE MECHANISM

[75] Inventors: John P. Wier; Robert A. Garrett, both of San Diego, Calif.

[73] Assignee: The United States of America as represented by the Secretary of the Navy, Washington, D.C.

[21] Appl. No.: 7,285

[22] Filed: Jan. 29, 1979

[51] Int. Cl.³ .............................................. B62D 11/04
[52] U.S. Cl. .................. 180/6.48; 180/7 R; 180/242; 301/5 P; 305/60
[58] Field of Search ............. 180/7 R, 7 A, 6.48, 180/6.5, 6.2; 301/5 P; 305/60

[56] References Cited

U.S. PATENT DOCUMENTS

| | | | |
|---|---|---|---|
| 2,488,310 | 11/1949 | Mayer | 180/7 R |
| 2,893,500 | 7/1959 | DeBaun | 180/7 R |
| 2,999,554 | 9/1961 | Wagner | 180/6.48 |
| 3,212,594 | 10/1965 | Scott | 180/7 R |
| 3,251,430 | 5/1966 | Veryzer | 180/7 R |
| 3,295,700 | 1/1967 | Ziegler | 180/7 R |
| 3,396,690 | 8/1968 | Tsunazawa | 180/6.2 |
| 3,420,326 | 1/1969 | Kusmer | 180/7 A |
| 3,465,843 | 9/1969 | Guinot | 301/5 P |
| 3,763,957 | 10/1973 | Hunt | 180/119 |
| 4,119,164 | 10/1978 | Fogg | 180/6.5 |

*Primary Examiner*—John P. Silverstrim
*Attorney, Agent, or Firm*—Richard S. Sciascia; Ervin F. Johnston; Thomas Glenn Keough

[57] ABSTRACT

A drive mechanism is provided particularly suitable for use in ambulators having a mobile platform that transports a paraplegic in a standing position, the unique drive mechanism enabling the platform to be of a minimum size with a very low center of gravity, and being movable about three axes to provide maximum maneuverability and access to confined spaces.

3 Claims, 6 Drawing Figures

AMBULATOR DRIVE MECHANISM

BACKGROUND OF THE INVENTION

The invention relates generally to drive mechanisms, and more specifically to a drive mechanism particularly suitable for ambulators in providing a low center of gravity and a high degree of maneuverability.

Numerous types of general purpose and specific purpose wheelchairs have been designed in an effort to accommodate the various needs of the orthopedically disabled. One specific need for a paraplegically disabled person is to be supported in a standing position to accomplish such tasks as may be required in such a position.

One such development is represented by U.S. Pat. No. 4,054,319 issued on Oct. 18, 1977 for a "Stand-Aid Invalid Wheelchair". This patented device provides a wheelchair to support a paraplegic in both a standing and seated position, and having linkage for moving the paraplegic to and from both positions. Although such a wheelchair represents an important advance in the art, because of its size it cannot operate in confined spaces, nor is it highly maneuverable, i.e. capable of spinning around a vertical axis. In a copending U.S. patent application, Ser. No. 062,835, and further identified as Navy Case No. 62,921, a wheelchair and stand up ambulator are constructed as separable units, with the ambulator detachable in order for the occupant to accomplish certain tasks while in a standing position apart from the wheelchair. The present invention is directed to the specific drive mechanism for the ambulator unit. The specific linkage which supports the occupant in a standing position on the ambulator is also covered in copending U.S. patent application, Ser. No. 062,835.

SUMMARY OF THE INVENTION

In accordance with the present invention a drive mechanism is designed for a vehicle, particularly suitable for use in an ambulator for paraplegics. The ambulator comprises a mobile platform on which the paraplegic is supported in a standing position and which functions as a chassis for the drive mechanism. The platform is fabricated with a minimum size for gaining access to confined spaces, and with a minimum height so that the paraplegic will feel secure and stable when standing on the platform. The drive mechanism enables movement of the ambulator along three axes of movement to provide maximum maneuverability. In a preferred embodiment, the drive mechanism includes a set of four wheels, each wheel mounted at a respective corner of a rectangular chassis. Each wheel has a substantially vertical axis of rotation. Around the periphery of each wheel is mounted a plurality of spaced, freely rotatable rollers, each roller having an axis of rotation lying in a common plane perpendicular to the axis of rotation of the wheel. Each wheel assembly is supported in the chassis so that the common plane containing the axis of rotation of said rollers is slightly inclined, i.e. 18 degrees, with respect to the surface over which the ambulator is propelled, so that during rotation one or two of the outermost rollers of each wheel assembly contact the surface at a time.

Each wheel is driven by a respective reversible D.C. motor, the motors being independently controlled by a suitable circuit, such as is described in detail in copending U.S. patent application Ser. No. 955,427 filed Oct. 27, 1978, entitled "Ambulator Control Circuit".

Through the employment of the present invention drive mechanism, the ambulator can be moved along three axes, namely the x, y and z. That is, the ambulator can be moved laterally to the right, to the left, forward and reverse, clockwise and counterclockwise, spinning about a vertical axis, and a slewing motion at angles 45°, 135°, 225° and 315° with respect to the front of the ambulator.

OBJECTS OF THE INVENTION

A primary purpose of the present invention is to provide a compact vehicle suitable for use as an ambulator which is highly maneuverable to enable a paraplegic to perform numerous complex tasks in a standing position.

Another important purpose is to provide such a vehicle with a minimum size platform for access to confined spaces, and one which has a very low center of gravity to enhance stability for the paraplegic standing on the platform.

Other objects, advantages and novel features of the invention will become apparent from the following detailed description of the invention when considered in conjunction with the accompanying drawings.

DESCRIPTION OF THE PREFERRED EMBODIMENT

Figure 1:
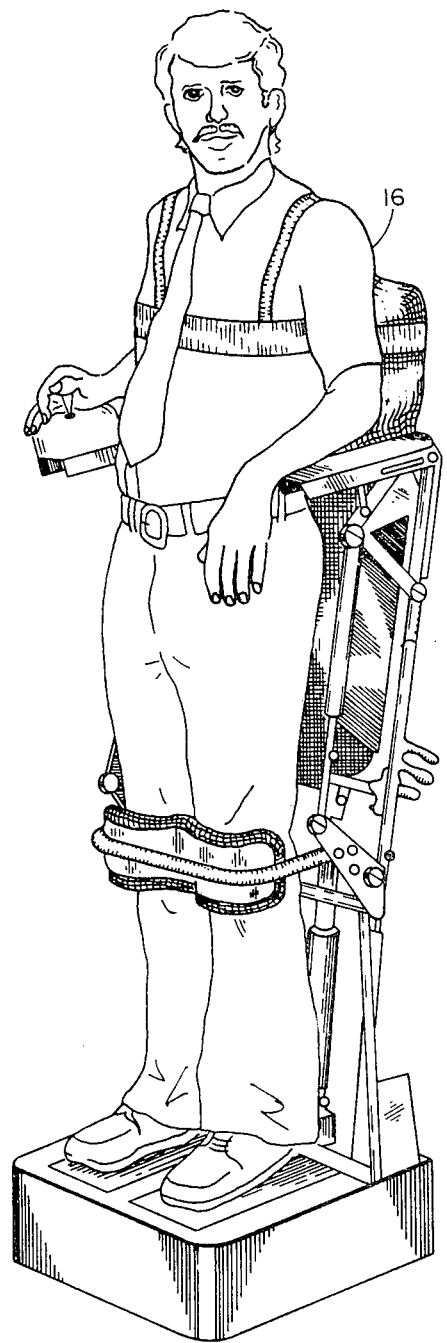
FIG. 1 is a perspective view of the present invention incorporated in an ambulator for supporting and transporting a paraplegic in a standing position.

Referring to the drawings where like reference numerals refer to similar parts throughout the figures, there is shown in FIG. 1 an ambulator 10 comprising a platform 12 on which is mounted a raising and lowering linkage 14 for supporting an occupant, i.e. a paraplegic 16. Linkage 14 and its associated components form no part of this invention, the details thereof being described in previously cited copending U.S. patent application Ser. No. 062,835 filed on Aug. 1, 1979 entitled "Integrated Wheelchair and Ambulator."

Platform 12 comprises a generally rectangular box-shaped structure, one prototype which proved satisfactory being 18"×18"×5". A chassis 18 is bolted within platform 12 and includes a horizontal base plate 20 to which is attached a plurality of wall partitions 22. Partitions 22 on the underside of base plate 20 form four corner compartments 24, each compartment housing a wheel assembly 26 designated by the suffixes A, B, C and D. A set of four compartments 28 are positioned between the wheel compartments for housing the electronic components of the control circuit, which as previously mentioned, forms no part of this invention.

Partitions 22 on the upper side of base plate 20 also form four upper corner compartments 30 directly above corner wheel compartments 24, each compartment 30 housing a D.C. reversible motor 32 for driving its respective wheel assembly 26. Upper partitions 22 also form a set of four compartments 34 positioned between the wheel assembly compartments 30 for housing the respective batteries 36 for the motors. A battery that has been found in practice to work satisfactorily is manufactured under the name "Carefree Rechargeable Battery" by the Eagle Picher Co., being a gel-type battery having 2 volts and 30 amp/hrs. Each battery forms the power source for a reversible drive D.C. motor 32, which is preferably a pancake-type motor having a printed circuit manufactured by the PMI Division of the Kollmorgen Corp., Glen Cove, New York.

One of the important features of the present invention resides in the construction and disposition of the four wheel drive mechanism, and as each wheel assembly is identical in construction, a description of one assembly should suffice for all four.

Figure 4:
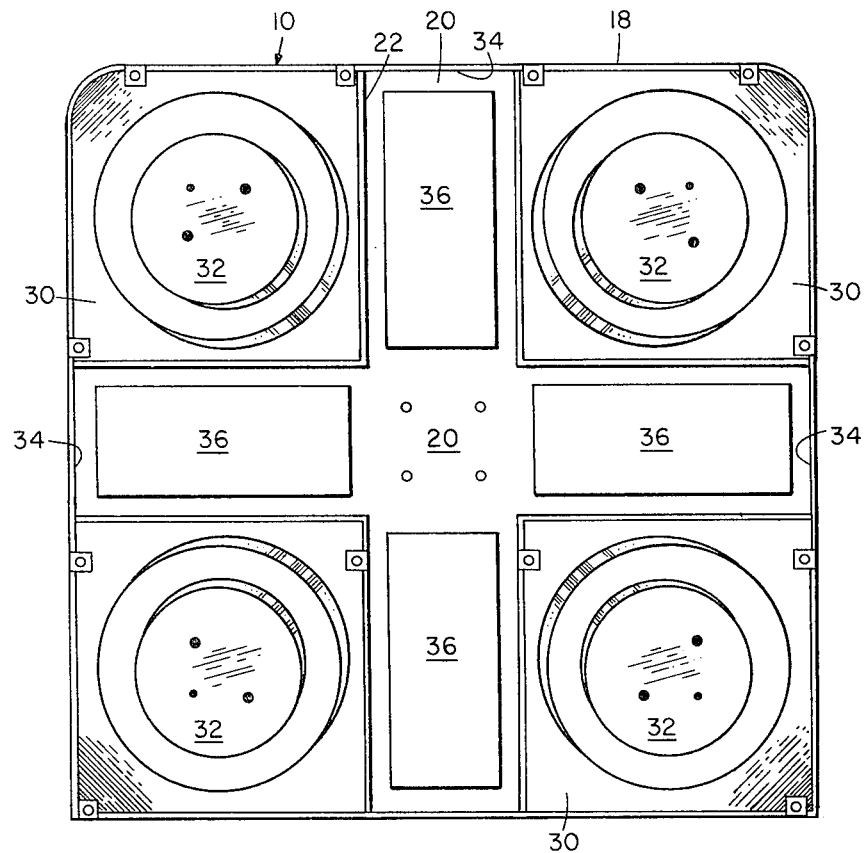
FIG. 4 is a top plan view of the platform with the top plate removed showing the disposition of the motors and respective batteries.
Figure 5:
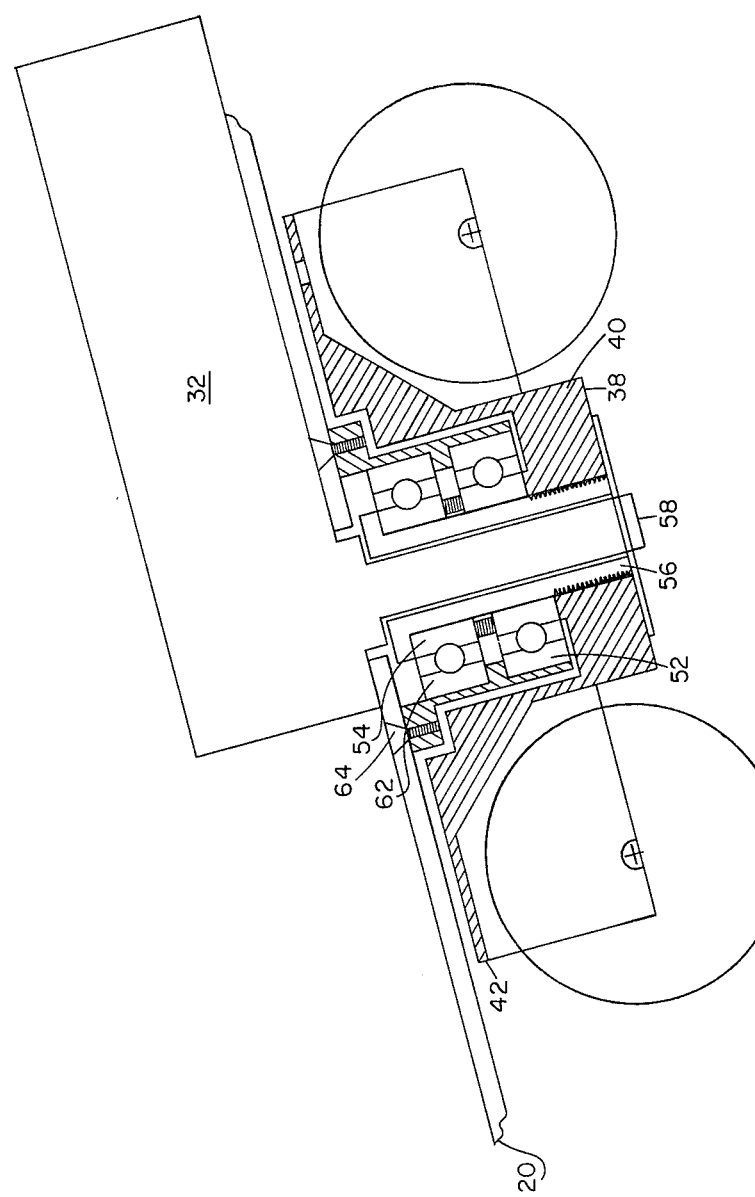
FIG. 5 is an enlarged cross-sectional view of a wheel taken along line V—V of FIG. 2.

As shown in FIGS. 4 and 5, each wheel assembly 26 comprises a wheel carriage 38 made of plastic or other suitable material having an integral hub portion 40 and a circular plate portion 42. A plurality of integral walls 44 are formed between the hub 40 and plate 42 equally spaced around the carriage between which are supported a plurality of rollers 46, made of teflon or other suitable material, eleven rollers being illustrated. Each roller is provided with a loosely fitting pivot shaft 48 extending therethrough and from both sides of each roller, the ends of the shafts being mounted in slots 50 formed on the ends of adjacent wall 42. Rollers 46 are freely rotatable on their respective shafts.

Hub 40 is rotatably mounted on a ball bearing 52 which has an inner race 54 sweated to a bearing shaft 56, which in turn is keyed to vertical shaft 58 of drive motor 32. Outer ball bearing race 60 is secured to a ball bearing housing 62 which in turn is attached by screws 64 to a respective housing plate 63 which is welded within respective corner compartments 24.

Figure 3:
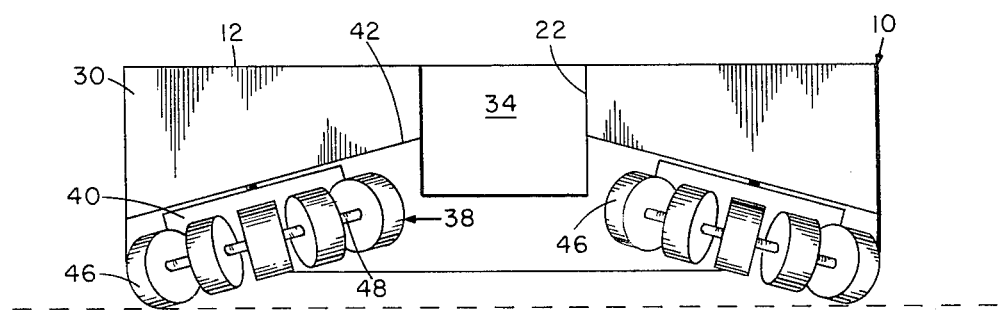
FIG. 3 is a cross-sectional view of the platform taken along line III—III of FIG. 2 showing the inclination of the wheels.

One of the unique features of this invention is that each wheel assembly 26 is canted at an angle with respect to the horizontal so that only a limited number of rollers on each wheel engage at the same time the surface over which the ambulator is propelled. This is achieved in the specific embodiment by mounting each of the four housing plates 63 in a canted position within each of their respective lower compartments 24. Specifically, housing plates 30, on which the wheel assemblies are mounted, are tilted inwardly and upwardly toward the center of platform 12, as is best shown in FIGS. 3 and 5, forming a pyramid configuration. A tilt angle of approximately 18 degrees has been found in practice to work satisfactorily. This specific arrangement during rotation of each wheel enables at least the cornermost roller at any given time to be in full contact with the surface, and possibly an edge of the immediately adjacent leading and trailing rollers at that time.

Figure 6:
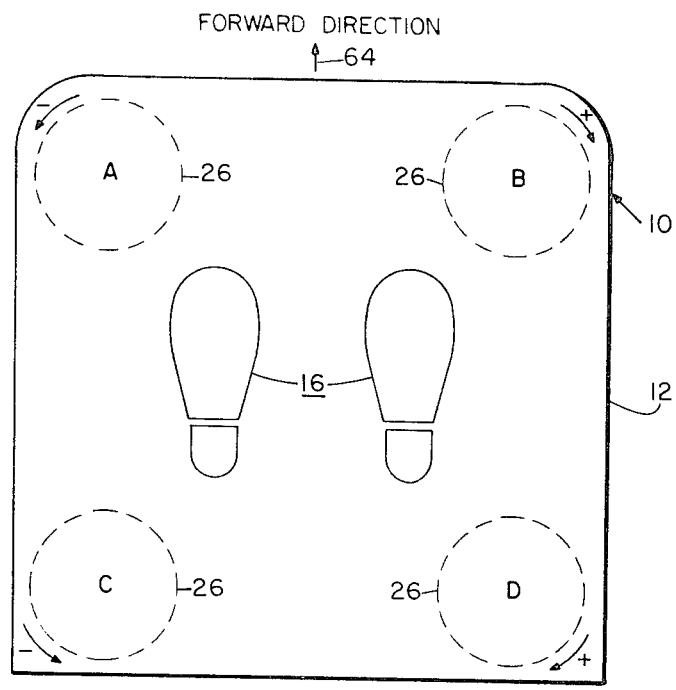
FIG. 6 is a schematic top view of the platform with the direction of rotation of each of the four wheel assemblies indicated to provide a forward movement as viewed by the paraplegic while standing on the platform.
Figure 2:
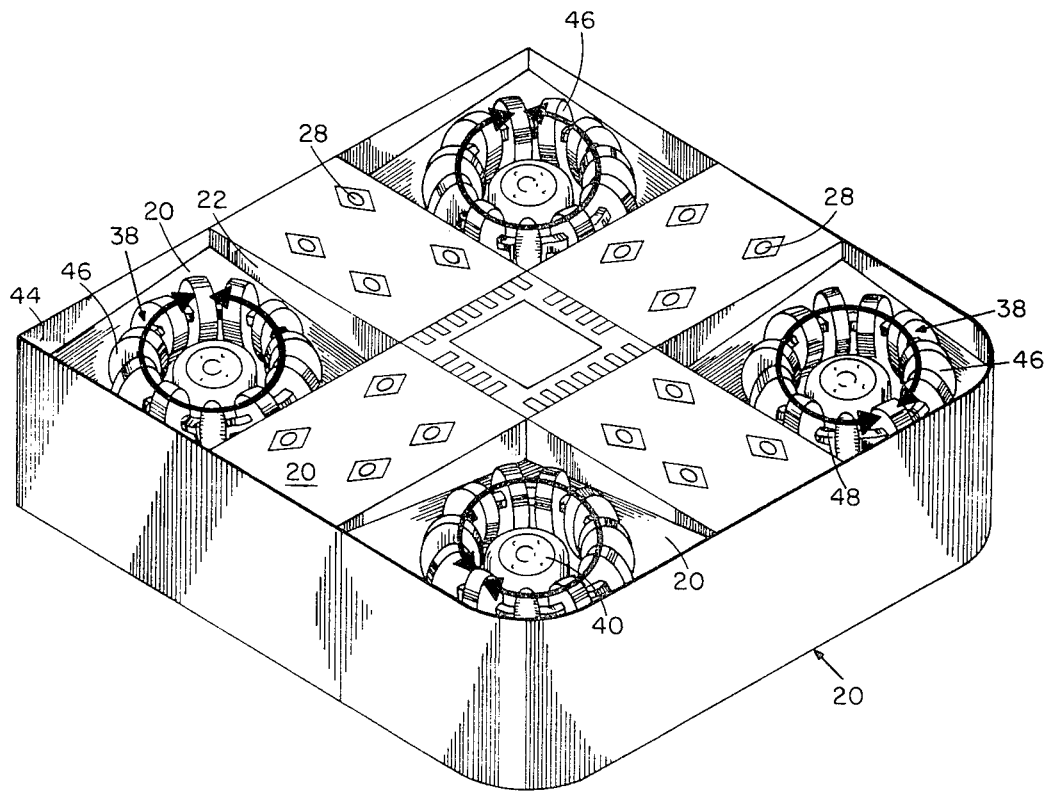
FIG. 2 is a bottom perspective view of the mobile ambulator platform showing the arrangement of the four driving wheel assemblies.

The direction of movement of the platform will depend on the various combinations of clockwise and counterclockwise rotations of each of the four independently driven wheel assemblies 26 (A, B, C & D). Referring to FIG. 6 there is shown for illustrative purposes a diagrammatic top view of the ambulator platform 12 showing the four wheel assemblies 26 and viewed by the paraplegic standing thereon. For a forward direction of platform motion indicated by arrow 64, specific rotation of wheel assemblies can be written as −A, +B, −C, +D, where a + sign indicates a clockwise rotation of a wheel assembly, and a − sign denotes a counterclockwise direction, as viewed by the paraplegic standing on platorm 12. The many other possible combinations of ambulator motion are ahieved by rotating the individual wheel assemblies as indicated in Table I below.

TABLE I

| Platform Direction | Wheel Assembly Rotation |
|---|---|
| Reverse | +A, −B, +C, −D |
| Right | −A, −B, +C, +D |
| Left | +A, +B, −C, −D |
| Slew 45° | −A, +D |
| Slew 135° | −B, +C |
| Slew 225° | +A, −D |
| Slew 315° | +B, −C |
| Clockwise Rotation | −A, −B, −C, −D |
| Counterclockwise Rotation | +A, +B, +C, +D |

The novel drive mechanism of this invention provides an ambulator having a minimum height making the center of gravity of the paraplegic substantially the same whether or not he is standing on the ambulator. This arrangement enhances a paraplegic's confidence and feeling of normalcy in the equipment he is using. Besides being smaller in size and being accessible in confined spaces, the ambulator is much more maneuverable than conventional equipment of this type, making the paraplegic's task more easily accomplished.

Obviously many modifications and variations of the present invention are possible in the light of the above teachings. It is therefore to be understood that within the scope of the appended claims the invention may be practiced otherwise than as specifically described.

What is claimed is:

1. A maneuverable, self-propelled land vehicle comprising:

a rectangular chassis;

a plurality of identical wheels for supporting and moving said chassis, each wheel mounted at a respective corner of said chassis, and each wheel having a fixed axis of rotation, each axis inclined in such a manner that all of said axes intersect below said chassis at a point on its vertical centerline, whereby the vehicle is provided with a minimum center of gravity;

each wheel comprising a plurality of rollers mounted in spaced relation around its periphery, each roller having an axis of rotation lying in a common plane perpendicular to the axis of rotation of its respective wheel;

said plane containing the roller axes being slightly inclined with respect to a surface over which the vehicle is to be propelled so that only a limited number of the rollers on each wheel engage the surface at any given time during wheel rotation;

an independently reversible drive means for each wheel, wherein each wheel can be rotated in either a clockwise or counterclockwise direction;

whereby driving the wheels in a preselected pattern can propel the vehicle in any movement in at least two axes.

2. The vehicle of claim 1 wherein each of said rollers has a substantial thickness with respect to its diameter to provide maximum traction with the surface.

3. The vehicle of claim 1 wherein the periphery of the rollers of each wheel are located close to the outer edges of said chassis to provide the largest wheel base.

* * * * *